United States Patent
Panabaker et al.

(10) Patent No.: US 8,793,066 B2
(45) Date of Patent: *Jul. 29, 2014

(54) ROUTE MONETIZATION

(75) Inventors: Ruston Panabaker, Redmond, WA (US); John C. Krumm, Redmond, WA (US); Jeffrey D. Couckuyt, Bothell, WA (US); Ivan J. Tashev, Kirkland, WA (US); Michael Lewis Seltzer, Seattle, WA (US); Neil W. Black, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

This patent is subject to a terminal disclaimer.

(21) Appl. No.: 11/957,115

(22) Filed: Dec. 14, 2007

(65) Prior Publication Data

US 2008/0091341 A1    Apr. 17, 2008

Related U.S. Application Data

(63) Continuation-in-part of application No. 11/426,903, filed on Jun. 27, 2006, now Pat. No. 7,610,151.

(51) Int. Cl.
*G01C 21/00* (2006.01)

(52) U.S. Cl.
USPC ............... 701/410; 701/425; 705/37

(58) Field of Classification Search
USPC ............ 701/202, 209, 211, 410, 425; 705/37
See application file for complete search history.

(56) References Cited

U.S. PATENT DOCUMENTS

| | | |
|---|---|---|
| 4,884,208 A | 11/1989 | Marinelli et al. |
| 4,939,663 A | 7/1990 | Baird |
| 5,187,667 A | 2/1993 | Short |
| 5,422,813 A | 6/1995 | Schuchman et al. |
| 5,444,442 A | 8/1995 | Sadakata et al. |
| 5,504,482 A | 4/1996 | Schreder |
| 5,606,695 A | 2/1997 | Dworzecki et al. |
| 5,629,854 A | 5/1997 | Schulte |
| 5,648,768 A | 7/1997 | Bouve |
| 5,774,073 A | 6/1998 | Maekawa et al. |

(Continued)

FOREIGN PATENT DOCUMENTS

| | | |
|---|---|---|
| CN | 1346474 A1 | 4/2002 |
| EP | 1519288 A1 | 3/2005 |

(Continued)

OTHER PUBLICATIONS

Mapquest Business Solutions Advantage APITM http://cdn.mapquest.com/corpb2b/bsolutions-advantageapi-pdf-whitepaper.pdf. Last accessed 10/4/07, 22 pages.

(Continued)

*Primary Examiner* — Mark Hellner
(74) *Attorney, Agent, or Firm* — Dave Ream; Doug Barker; Micky Minhas

(57) ABSTRACT

A user can be compensated for taking detours from a projected route. Commonly, the reason for the compensation is that the user will be subjected to advertising, the user will pass by an establishment she is likely to visit, or to ease traffic congestion. Analysis of an area takes place and monetization opportunities are determined based upon the results of the analysis. A route between at least about two locations can be altered such that the user is provided a reward, commonly in an optimized manner.

14 Claims, 10 Drawing Sheets

(56) References Cited

U.S. PATENT DOCUMENTS

| | | |
|---|---|---|
| 5,802,492 A | 9/1998 | DeLorme |
| 5,812,069 A | 9/1998 | Albrecht et al. |
| 5,822,712 A | 10/1998 | Olsson et al. |
| 5,933,094 A | 8/1999 | Goss et al. |
| 5,938,720 A | 8/1999 | Tamai |
| 5,987,374 A | 11/1999 | Akutsu et al. |
| 6,038,444 A | 3/2000 | Schipper et al. |
| 6,047,260 A | 4/2000 | Levinson et al. |
| 6,060,989 A | 5/2000 | Gehlot |
| 6,119,065 A | 9/2000 | Shimada et al. |
| 6,124,826 A | 9/2000 | Garthwaite et al. |
| 6,199,009 B1 | 3/2001 | Meis et al. |
| 6,199,045 B1 | 3/2001 | Giniger |
| 6,216,086 B1 | 4/2001 | Seymour et al. |
| 6,236,932 B1 | 5/2001 | Fastenrath et al. |
| 6,240,364 B1 | 5/2001 | Kerner et al. |
| 6,249,742 B1 | 6/2001 | Friederich et al. |
| 6,253,980 B1 | 7/2001 | Murakami et al. |
| 6,298,302 B2 | 10/2001 | Walgers et al. |
| 6,314,365 B1 | 11/2001 | Smith |
| 6,317,686 B1 | 11/2001 | Ran |
| 6,321,158 B1 | 11/2001 | DeLorme et al. |
| 6,339,746 B1 | 1/2002 | Sugiyama et al. |
| 6,353,398 B1 | 3/2002 | Amin et al. |
| 6,374,182 B2 | 4/2002 | Bechtolsheim et al. |
| 6,381,533 B1 | 4/2002 | Crane et al. |
| 6,381,535 B1 | 4/2002 | Durocher et al. |
| 6,381,538 B1 | 4/2002 | Robinson et al. |
| 6,401,027 B1 | 6/2002 | Xu et al. |
| 6,401,038 B2 | 6/2002 | Gia |
| 6,415,226 B1 | 7/2002 | Kozak |
| 6,445,968 B1 | 9/2002 | Jalla |
| 6,470,267 B1 | 10/2002 | Nozaki |
| 6,480,783 B1 | 11/2002 | Myr |
| 6,510,379 B1 | 1/2003 | Hasegawa et al. |
| 6,526,350 B2 | 2/2003 | Sekiyama |
| 6,542,811 B2 | 4/2003 | Doi |
| 6,542,812 B1 | 4/2003 | Obradovich et al. |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,629,034 B1 | 9/2003 | Kozak et al. |
| 6,636,145 B1 | 10/2003 | Murakami et al. |
| 6,640,187 B1 | 10/2003 | Chenault et al. |
| 6,640,212 B1 | 10/2003 | Rosse |
| 6,672,506 B2 | 1/2004 | Swartz et al. |
| 6,687,608 B2 | 2/2004 | Sugimoto et al. |
| 6,697,730 B2 | 2/2004 | Dickerson |
| 6,711,474 B1 | 3/2004 | Treyz et al. |
| 6,721,650 B2 | 4/2004 | Fushiki et al. |
| 6,721,654 B2 | 4/2004 | Akiyama |
| 6,741,188 B1 | 5/2004 | Miller et al. |
| 6,744,383 B1 | 6/2004 | Alfred et al. |
| D494,584 S | 8/2004 | Schlieffers et al. |
| 6,778,903 B2 | 8/2004 | Robinson et al. |
| 6,785,607 B2 | 8/2004 | Watanabe et al. |
| 6,796,505 B2 | 9/2004 | Pellaumail et al. |
| 6,813,501 B2 | 11/2004 | Kinnunen et al. |
| 6,813,558 B1 | 11/2004 | Lapstun et al. |
| 6,826,472 B1 | 11/2004 | Kamei et al. |
| 6,837,436 B2 | 1/2005 | Swartz et al. |
| 6,847,889 B2 | 1/2005 | Park et al. |
| 6,865,482 B2 | 3/2005 | Hull |
| 6,871,137 B2 | 3/2005 | Scaer et al. |
| 6,882,930 B2 | 4/2005 | Trayford et al. |
| 6,898,432 B1 | 5/2005 | Jiang |
| 6,898,517 B1 | 5/2005 | Froeberg |
| 6,909,380 B2 | 6/2005 | Brooke |
| 6,952,559 B2 | 10/2005 | Bates et al. |
| 6,965,325 B2 | 11/2005 | Finnern |
| 6,970,131 B2 | 11/2005 | Percy et al. |
| 6,983,139 B2 | 1/2006 | Dowling et al. |
| 6,985,810 B2 | 1/2006 | Moitra et al. |
| 6,993,326 B2 | 1/2006 | Link, II et al. |
| 7,010,501 B1 | 3/2006 | Roslak et al. |
| 7,016,307 B2 | 3/2006 | Vasudev et al. |
| 7,027,915 B2 | 4/2006 | Craine |
| 7,040,541 B2 | 5/2006 | Swartz et al. |
| 7,043,356 B2 | 5/2006 | Linn |
| 7,058,506 B2 | 6/2006 | Kawase et al. |
| 7,062,376 B2 | 6/2006 | Oesterling |
| 7,063,263 B2 | 6/2006 | Swartz et al. |
| 7,069,308 B2 | 6/2006 | Abrams |
| 7,076,409 B2 | 7/2006 | Agrawala et al. |
| 7,080,139 B1 | 7/2006 | Briggs et al. |
| 7,082,364 B2 | 7/2006 | Adamczyk |
| 7,092,819 B2 | 8/2006 | Odachi et al. |
| 7,103,368 B2 | 9/2006 | Teshima |
| 7,120,444 B2 | 10/2006 | Silvester |
| 7,149,625 B2 | 12/2006 | Mathews et al. |
| 7,171,378 B2 | 1/2007 | Petrovich et al. |
| 7,195,157 B2 | 3/2007 | Swartz et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 | 7/2007 | Yokota et al. |
| 7,245,925 B2 | 7/2007 | Zellner |
| 7,250,907 B2 | 7/2007 | Krumm et al. |
| 7,286,837 B2 | 10/2007 | Giniger et al. |
| 7,295,805 B2 | 11/2007 | Walker |
| 7,308,236 B2 | 12/2007 | Fukushima |
| 7,376,414 B2 | 5/2008 | Engstrom |
| 7,385,501 B2 | 6/2008 | Miller et al. |
| 7,403,905 B2 | 7/2008 | Shioda et al. |
| 7,466,986 B2 | 12/2008 | Halcrow et al. |
| 7,496,484 B2 | 2/2009 | Agrawala et al. |
| 7,512,487 B1 | 3/2009 | Golding et al. |
| 7,522,995 B2 | 4/2009 | Nortrup |
| 7,587,273 B2 | 9/2009 | Ohnishi et al. |
| 7,610,151 B2 | 10/2009 | Letchner et al. |
| 7,624,024 B2 | 11/2009 | Levis et al. |
| 7,627,414 B2 | 12/2009 | Goto et al. |
| 7,912,637 B2 | 3/2011 | Horvitz et al. |
| 7,948,400 B2 | 5/2011 | Horvitz et al. |
| 8,024,112 B2 | 9/2011 | Krumm et al. |
| 2001/0014849 A1 | 8/2001 | King et al. |
| 2001/0020211 A1 | 9/2001 | Takayama et al. |
| 2001/0025222 A1 | 9/2001 | Bechtolsheim et al. |
| 2001/0029425 A1 | 10/2001 | Myr |
| 2001/0030664 A1 | 10/2001 | Shulman et al. |
| 2001/0032121 A1 | 10/2001 | Le |
| 2001/0037271 A1 | 11/2001 | Kubota |
| 2001/0039512 A1 | 11/2001 | Nicholson |
| 2001/0044321 A1 | 11/2001 | Ausems et al. |
| 2001/0044693 A1 | 11/2001 | Gotou et al. |
| 2001/0055165 A1 | 12/2001 | McCarthy |
| 2002/0004700 A1 | 1/2002 | Klein |
| 2002/0010610 A1 | 1/2002 | Jacobs et al. |
| 2002/0010615 A1 | 1/2002 | Jacobs |
| 2002/0032035 A1 | 3/2002 | Teshima |
| 2002/0049742 A1 | 4/2002 | Chan et al. |
| 2002/0055872 A1 | 5/2002 | LaBrie |
| 2002/0082771 A1 | 6/2002 | Anderson |
| 2002/0084917 A1 | 7/2002 | Hauptman et al. |
| 2002/0091568 A1 | 7/2002 | Kraft et al. |
| 2002/0097193 A1 | 7/2002 | Powers |
| 2002/0103693 A1 | 8/2002 | Bayer et al. |
| 2002/0107027 A1 | 8/2002 | O'Neil |
| 2002/0121981 A1 | 9/2002 | Munch |
| 2002/0124050 A1 | 9/2002 | Middeljans |
| 2002/0143464 A1 | 10/2002 | Blewitt |
| 2002/0167442 A1 | 11/2002 | Taylor |
| 2002/0169540 A1 | 11/2002 | Engstrom |
| 2002/0184091 A1 | 12/2002 | Pudar |
| 2003/0018521 A1 | 1/2003 | Kraft et al. |
| 2003/0023371 A1 | 1/2003 | Stephens |
| 2003/0043045 A1 | 3/2003 | Yasushi |
| 2003/0046158 A1 | 3/2003 | Kratky |
| 2003/0065442 A1 | 4/2003 | Touney |
| 2003/0135304 A1 | 7/2003 | Sroub et al. |
| 2003/0158650 A1 | 8/2003 | Abe et al. |
| 2003/0182052 A1 | 9/2003 | DeLorme et al. |

(56) References Cited

U.S. PATENT DOCUMENTS

| | | |
|---|---|---|
| 2003/0182183 A1 | 9/2003 | Pribe |
| 2003/0233278 A1 | 12/2003 | Marshall |
| 2004/0059622 A1 | 3/2004 | Mueller |
| 2004/0076279 A1 | 4/2004 | Taschereau |
| 2004/0088392 A1 | 5/2004 | Barrett et al. |
| 2004/0117195 A1* | 6/2004 | Bodin .............................. 705/1 |
| 2004/0117246 A1 | 6/2004 | Applebaum |
| 2004/0143496 A1 | 7/2004 | Saenz |
| 2004/0158483 A1 | 8/2004 | Lecouturier |
| 2004/0181495 A1 | 9/2004 | Grush |
| 2004/0192351 A1 | 9/2004 | Duncan |
| 2004/0193492 A1 | 9/2004 | Applebaum |
| 2004/0201500 A1 | 10/2004 | Miller et al. |
| 2004/0225437 A1 | 11/2004 | Endo et al. |
| 2004/0233045 A1 | 11/2004 | Mays |
| 2004/0243305 A1 | 12/2004 | Kozak |
| 2005/0004757 A1 | 1/2005 | Neeman et al. |
| 2005/0027444 A1 | 2/2005 | Kim |
| 2005/0038596 A1 | 2/2005 | Yang et al. |
| 2005/0049765 A1 | 3/2005 | Chetia et al. |
| 2005/0085997 A1 | 4/2005 | Park |
| 2005/0102098 A1 | 5/2005 | Montealegre et al. |
| 2005/0125148 A1 | 6/2005 | Van Buer et al. |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0198287 A1 | 9/2005 | Sauve et al. |
| 2005/0216182 A1 | 9/2005 | Hussain et al. |
| 2005/0234758 A1 | 10/2005 | Nishi |
| 2005/0256754 A1 | 11/2005 | Nastacio |
| 2005/0266858 A1 | 12/2005 | Miller et al. |
| 2005/0267651 A1 | 12/2005 | Arango et al. |
| 2005/0272442 A1 | 12/2005 | Miller et al. |
| 2005/0288849 A1 | 12/2005 | Rothman et al. |
| 2006/0019676 A1 | 1/2006 | Miller |
| 2006/0041379 A1 | 2/2006 | Brulle-Drews |
| 2006/0041500 A1 | 2/2006 | Diana et al. |
| 2006/0053038 A1 | 3/2006 | Warren et al. |
| 2006/0058947 A1 | 3/2006 | Schalk |
| 2006/0074531 A1 | 4/2006 | Saarinen et al. |
| 2006/0095374 A1 | 5/2006 | Lo et al. |
| 2006/0123053 A1 | 6/2006 | Scannell |
| 2006/0129313 A1* | 6/2006 | Becker et al. ................. 701/202 |
| 2006/0135180 A1 | 6/2006 | Jakel et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge et al. |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1* | 3/2007 | Huang et al. .................... 705/37 |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 | 8/2007 | Bliss et al. |
| 2007/0203644 A1 | 8/2007 | Thota et al. |
| 2007/0208495 A1 | 9/2007 | Chapman et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0225882 A1 | 9/2007 | Yamaguchi et al. |
| 2007/0244627 A1 | 10/2007 | Boss et al. |
| 2007/0250259 A1 | 10/2007 | Dare |
| 2007/0257792 A1 | 11/2007 | Gold |
| 2007/0293958 A1 | 12/2007 | Stehle et al. |
| 2007/0299599 A1 | 12/2007 | Letchner et al. |
| 2008/0015763 A1 | 1/2008 | Kitazaki et al. |
| 2008/0033644 A1 | 2/2008 | Bannon |
| 2008/0046134 A1 | 2/2008 | Bruce et al. |
| 2008/0046165 A1 | 2/2008 | Downs et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2008/0200312 A1 | 8/2008 | Tagliabue |
| 2008/0293430 A1 | 11/2008 | Blom et al. |
| 2008/0312819 A1 | 12/2008 | Banerjee |
| 2009/0005973 A1 | 1/2009 | Salo |
| 2009/0012703 A1 | 1/2009 | Aso et al. |
| 2009/0048771 A1 | 2/2009 | Speier et al. |
| 2009/0082917 A1 | 3/2009 | Adachi |
| 2009/0248292 A1 | 10/2009 | Adachi et al. |
| 2010/0036610 A1 | 2/2010 | Urciuoli et al. |

FOREIGN PATENT DOCUMENTS

| | | |
|---|---|---|
| EP | 1659368 A1 | 5/2006 |
| JP | 2000258174 | 9/2000 |
| JP | 2002131065 | 5/2002 |
| JP | 2002156234 A | 5/2002 |
| JP | 2002230696 | 8/2002 |
| JP | 2003216989 | 7/2003 |
| JP | 2007232610 | 9/2007 |
| KR | 1020060016832 A | 6/2006 |
| WO | 9854632 | 12/1998 |
| WO | WO0002389 A1 | 1/2000 |
| WO | WO0108413 A1 | 2/2001 |
| WO | 0163451 | 8/2001 |
| WO | 0193070 | 12/2001 |
| WO | WO0239367 A1 | 5/2002 |
| WO | WO03019478 A1 | 3/2003 |
| WO | WO03042950 A1 | 5/2003 |
| WO | WO03063521 A2 | 7/2003 |
| WO | 2004021306 | 3/2004 |
| WO | 2005036471 | 4/2004 |
| WO | WO2004084437 A1 | 9/2004 |
| WO | 2005024667 A1 | 3/2005 |
| WO | WO2007131225 A2 | 11/2007 |

OTHER PUBLICATIONS

Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.

New Magellan (Thales) MAESTRO4000 Vehicle Navigation System http://cgi.ebay.com/New-MAESTR04000-Vehicle-Navigation-System-980919-01_W0QQitemZ110163915037QQihZ001QQcategory Z73332QQcmdZViewItem. Last accessed Oct. 4, 2007, 5 pages.

Moshe Ben-Akiva, et al. Development of a Route Guidance Generation System for Real-Time Application http:/rosowww.epfl.ch/mbi/papers/chania.pdf. Last accessed Apr. 10, 2007, 6 pages.

W.-T. Balke, et al. A Situation-aware Mobile Traffic Information System http://www.l3s.de/~balke/paper/hicss03.pdf. Last accessed Apr. 10, 2007, 10 pages.

Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.

Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.

Sergi Marti, et al. DHT Routing Using Social Links. http://iptps04.cs.ucsd.edu/papers/marti-social.pdf. Last accessed Oct. 3, 2007, 6 pages.

(56) References Cited

OTHER PUBLICATIONS

Antonio Kruger, et al. The Connected User Interface: Realizing a Personal Situated Navigation Service. IUI'04, Jan. 13-16, 2004, Madeira, Funchal, Portugal. ACM 1-58113-815-6/04/0001 www.medien.ifi.lmu.de/pubdb/publications/pub/butz2004userinterface/butz2004userinterface.pdf. Last accessed Oct. 3, 2007, 8 pages.

Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.

Boualem Benatallah, et al. OCEAN—Scalable and Adaptive Infrastructure for On-board Information Access, UNSW-CSE-TR-0601, Jan. 2006. http://www.cse.unsw.edu.au/~libman/papers/unsw601.pdf. Last accessed Oct. 3, 2007, 14 pages.

N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.

Alessandra Agostini, et al. Integrated Profile Management for Mobile Computing http://webmind.dico.unimi.it/papers/AI2IA.pdf. Last accessed Oct. 3, 2007, 5 pages.

MPOS AdSpace http://www.xiam.com/xiam.products.adspace.shtml. Last accessed Oct. 5, 2007, 1 page.

Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.

Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.

S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/TR%20B%2004%2Orc.pdf. Last accessed Oct. 3, 2007, 22 pages.

Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.

Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.

Gunther Retscher, et al. NAVIO—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.

About Amaze, 2000-2007 LocatioNet Systems Ltd http://www.amazegps.com/docs/amAze_UM_en%203.1.pdf. Last accessed Oct. 4, 2007, 37 pages.

Route 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.

Vijoy Pandey, et al. Exploiting User Profiles to Support Differentiated Services in Next-Generation Wireless Networks. Jul. 15, 2002 http://networks.cs.ucdavis.edu/~ghosal/Research/publications/vijoy-profiling-network-magazine.pdf. Last accessed Oct. 4, 2007, 23 pages.

Franziska Klugl, et al. Route Decision Behaviour in a Commuting Scenario: Simple Heuristics Adaptation and Effect of Traffic Forecast . Journal of Artificial Societies and Social Simulation vol. 7, No. 1. Published: Jan. 31, 2004. http://jasss.soc.surrey.ac.uk/7/1/1.html. Last accessed Dec. 11, 2007, 21 pages.

Field Service Route Optimization for Energy and Cost Efficiency http://www.californiagreensolutions.com/cgi-bin/gt/tpl.h,content=381. Last accessed Dec. 10, 2007, 2 pages.

Modelling the impact of incentives on route choice and traffic safety using a route choice simulator experiment http://www.aida.utwente.nl/Nieuws/Vacancy_AIDA-STOK_pilot.whlink/. Last accessed Dec. 10, 2007, 7 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontent.cgi?article=1254&context=its/path. Last accessed Dec. 7, 2007, 48 pages.

Christine M. Johnson. The National ITS Program: Where We've Been and Where We're Going http://66.102.1.104/scholar?hl=en&lr=&q=cache:flK6zDerzTQJ:plan2op.fhwa.dot.gov/pdfs/Pdf1/Edl03531.pdf. Last accessed Dec. 11, 2007, 12 pages.

Federal Highway Administration FHWA Domestic Pedestrian Safety Scanning Tour, Sep. 2005. http://66.102.1.104/scholar?hl=en&lr=&q=cache:3cGz2QGEKHkJ:www.cdtcmpo.org/bike/pedsafety.pdf. Last accessed Dec. 11, 2007, 64 pages.

Lisa J. Molnar, et al. Developing Information Systems for the Driving Tourist: A Literature Review, Feb. 1996. http://66.102.1.104/scholar?hl=en&lr=&q=cache:GJzx9CvxhCQJ:sambuca.umdl.umich.edu:8080/handle/2027.42/1160. Last accessed Dec. 11, 2007, 81 pages.

Martin O'Hara. Automated Congestion Charge Payment Scheme Using Smartnav Intelligent Satellite Navigation System, Apr. 13, 2005. Last accessed Dec. 11, 2007, 7 pages. http://www.tridatacom.co.uk/Downloads/papers/Papers/RIN%20Congestion%20130405.pdf.

James Baring. The Solution to the Traffic Congestion Problem, Dec. 1, 2006. http://revelstoke.org.uk/gsmpccs.htm. Last accessed Dec. 11, 2007, 5 pages.

Atlanta Unveils Traffic Reduction Plan, posted Aug. 28, 2007. http://www.environmentaldefense.org/article.cfm?contentID=6812. Last accessed Dec. 11, 2007, 1 page.

Goncalo Correia, et al. Car Pooling Clubs: Solution for the Affiliation Problem in Traditional/Dynamic Ridesharing Systems http://www.iasi.cnr.it/ewgt/16conference/ID92.pdf. 6 pages.

Pilot Tests of Dynamic Ridesharing, updated Jan. 23, 2007. http://www.ridenow.org/ridenow_summary.html. Last accessed Dec. 11, 2007, 35 pages.

iCarpool http://www.icarpool.com/en/TransportationPlanner.htm. Last accessed Dec. 11, 2007, 2 pages.

Ecolane Dynamic Carpool™, Ecolane Finland Oy 2006. http://www.ecolane.com/services/carpool/index.html. Last accessed Dec. 11, 2007, 1 page.

Route Planner, vol. 3—Modules, (Route Planner—Sep. 6, 2002—LA-UR-00-1767—TRANSIMS 3.0). http://ndssl.vbi.vt.edu/Publications/TransimsVol3Ch4.pdf. Last accessed Dec. 11, 2007, 60 pages.

Meredith Williams. Reduce Stress and Stay Organized While Running Errands http://www.microsoft.com/athome/intouch/directions.mspx. Last accessed Dec. 11, 2007, 3 pages.

TomTom Itinerary Planning http://www.gpsreview.net/tomtom-itinerary-planning/. Last accessed Dec. 11, 2007, 12 pages.

Non-Final Office Action mailed Aug. 17, 2010 in U.S. Appl. No. 12/033,690.

Non-Final Office Action mailed Aug. 17, 2010 in U.S. Appl. No. 12/033,652.

Non-Final Office Action mailed Apr. 27, 2011 in U.S. Appl. No. 11/957,127.

Non-Final Office Action mailed May 27, 2011 in U.S. Appl. No. 11/957,139.

Final Office Action mailed Apr. 21, 2011 in U.S. Appl. No. 11/957,206.

Non-Final Office Action mailed May 3, 2011 in U.S. Appl. No. 11/957,210.

Final Office Action mailed Feb. 1, 2011 in U.S. Appl. No. 12/033,690.

Final Office Action mailed Mar. 18, 2011 in U.S. Appl. No. 12/033,652.

Non-Final Office Action mailed Aug. 23, 2010 in U.S. Appl. No. 11/957,210.

Final Office Action mailed 12/13/10 in U.S. Appl. No. 11/957,210.

(56) References Cited

OTHER PUBLICATIONS

Non-Final Office Action mailed Nov. 1, 2010 in U.S. Appl. No. 11/957,182.
Final Office Action mailed Feb. 14, 2011 in U.S. Appl. No. 11/957,182.
Non-Final Office Action mailed Nov. 19, 2010 in Serial No. 11/957,206.
Non-final Office Action mailed Mar. 25, 2011 in U.S. Appl. No. 11/957,219.
Non-Final Office Action mailed Mar. 29, 2011 in U.S. Appl. No. 12/033,627.
Non-Final Office Action mailed Mar. 30, 2011 in U.S. Appl. No. 11/957,188.
Non-Final Office Action mailed Mar. 30, 2011 in U.S. Appl. No. 11/957,167.
International Search Report with Written Opinion dated Aug. 24, 2009 (PCT/US2009/030377).
International Search Report with Written Opinion dated Aug. 24, 2009 (PCT/US2009/030380).
International Search Report with Written Opinion dated Jun. 29, 2009 (PCT/US2008/083543).
International Search Report with Written Opinion dated Jun. 22, 2009 (PCT/US2008/083538).
Non-Final Office Action mailed Jun. 13, 2011 in U.S. Appl. No. 12/033,690.
Non-Final Office Action mailed Mar. 13, 2012 in U.S. Appl. No. 11/957,127, 7 pages.
Non-Final Office Action mailed Mar. 28, 2012 in U.S. Appl. No. 12/033,627, 12 pages.
Non-Final Office Action mailed May 15, 2012 in U.S. Appl. No. 11/957,206, 10 pages.
Final Office Action mailed Apr. 12, 2012 in U.S. Appl. No. 11/957,151, 15 pages.
Notice of Allowance mailed Dec. 21, 2012 in U.S. Appl. No. 11/957,127, 8 pages.
Final Office Action mailed Nov. 16, 2012 in U.S. Appl. No. 12/033,627, 12 pages.
Non-Final Office Action mailed Nov. 15, 2012 in U.S. Appl. No. 11/957,188, 12 pages.
Final Office Action mailed Jan. 24, 2012 in U.S. Appl. No. 11/957,219.
Final Office Action mailed Dec. 1, 2011 in U.S. Appl. No. 12/033,690.
Final Office Action mailed Feb. 1, 2012 in U.S. Appl. No. 12/033,652.
Final Office Action mailed Nov. 16, 2011 in U.S. Appl. No. 11/957,188.
Final Office Action mailed Jan. 13, 2012 in U.S. Appl. No. 11/957,139.
Final Office Action mailed Dec. 22, 2011 in U.S. Appl. No. 11/957,206.
Non-Final Office Action mailed Mar. 27, 2013 in U.S. Appl. No. 12/033,690, 35 pages.
Non-Final Office Action mailed Apr. 19, 2013 in U.S. Appl. No. 12/033,652, 27 pages.
Non-Final Office Action mailed May 8, 2013 in U.S. Appl. No. 12/033,627, 12 pages.
Notice of Allowance mailed Mar. 1, 2013 in U.S. Appl. No. 11/957,188, 6 pages.
Non-Final Office Action mailed May 8, 2013 in U.S. Appl. No. 11/957,151, 16 pages.
Final Office Action mailed Aug. 22, 2012 in U.S. Appl. No. 11/957,206, 8 pages.
Simon Handley, et al. Learning to Predict the Duration of an Automobile Trip. Proceedings of the Fourth International Conference on Knowledge Discovery and Data Mining, 1998, pp. 1-5, New York.
John Fawcett, et al. Adaptive Routing for Road Traffic. IEEE Computer Graphics and Applications. May/Jun. 2000, pp. 46-53. vol. 20, No. 3.
Karen Zita Haigh, et al. Exploiting Domain Geometry in Analogical Route Planning. Journal of Experimental and Theoretical AI, 1997. pp. 509-541. vol. 9, No. 4.
John Krumm, et al. The Microsoft Multiperson Location Survey. Aug. 2005, pp. 1-4, Microsoft Research.
Lawrence R. Rabiner, A Tutorial on Hidden Markov Models and Selected Applications in Speech Recognition. Proceedings of the IEEE. Feb. 1989. vol. 77, No. 2. pp. 257-286.
Auto Route. http://www.microsoft.com/uk/homepc/autoroute/see/default.mspx. Last accessed on Mar. 1, 2006. 2006 Microsoft Corporation.
Take a Free Trip on Auto-Pilot. http://www.freetrip.com/. Last accessed on Mar. 1, 2006. 2 pgs.
Jeff Kurtz, et al. Map Navigation Experiment. http://www.itl.nist.gov/iaui/vvrg/nist-icv/experiments/mapnav/mapnav.html. Last accessed on Mar. 1, 2006. 3 pgs.
Stefan Edelkamp, et al. Route planning and map inference with global positioning traces. Computer Science in Perspective. 2003. pp. 128-151. Springer-Verlag New York, Inc.
Joao Paulo Barros. Activities as Behaviour Aspects. http://lglwww.epfl.ch/workshops/uml2002/papers/barros.pdf. Last accessed on Mar. 3, 2006, 6 pgs.
K Meister, et al. Generating daily activity schedules for households using Genetic Algorithms. 5th Swiss Transport Research Conference. Mar. 9-11, 2005. 26 pgs. Monte Verita/Ascona.
S.T. Doherty, et al. The Development of a Unified Modeling Framework for the Household Activity-Travel Scheduling Process. Traffic and Mobility: Simulation-Economics-Environment, eds. W. Brilon, F. Huber, M. Schreckengerg, and H. Wallentowitzpp. pp. 35-56. Berlin: Springer.
Daniel Ashbrook, et al. Enabling Ad{Hoc Collaboration Through Schedule Learning and Prediction. http://www-static.cc.gatech.edu/fac/Thad.Starner/p/031_20_Activity/chi_mobihoc-2002.pdf. Last accessed on Mar. 2, 2006. 4 pgs.
Mattias•Stergren, et al. Road Talk: A Roadside Location-Dependent Audio Message System for Car Drivers. Journal of Mobile Multimedia. Feb. 25, 2005. pp. 47-61. vol. 1, No. 1. Rinton Press.
Joseph Schwartz. Microsoft Releases MapPoint 2002. Directions Magazine. Apr. 24, 2001. pp. 1-4. Directions Media. Glencoe, IL.
Oscar Franzese, et al. Traffic Simulation Application to Plan Real-Time distribution Routes. Proceedings of the 2002 Winter Simulation Conference. 2002. pp. 1214-1218.
B.L. Smith, et al Meeting Real-Time Traffic Flow Forecasting Requirements with Imprecise Computations. Computer-Aided Civil and Infrastructure Engineering. May 2003. pp. 201-213. vol. 18, No. 3. Blackwell Publishing.
Non-Final Office Action mailed Aug. 14, 2013 in U.S. Appl. No. 11/957,139, 15 pages.
Non-Final Office Action mailed Jun. 3, 2011 in U.S. Appl. No. 12/466,308, 8 pages.
Final Office Action mailed Nov. 16, 2011 in U.S. Appl. No. 12/466,308, 14 pages.
Non-Final Office Action mailed Jul. 23, 2013 in U.S. Appl. No. 12/466,308, 6 pages.
Non-Final Office Action mailed Sep. 3, 2013 in U.S. Appl. No. 12/033,652, 28 pages.
Broadhurst, et al., Monte Carlo Road Safety Reasoning, presented at the IEEE Intelligent Vehicle Symposium (IV2005), IEEE.
Final Office Action mailed Oct. 5, 2011 in U.S. Appl. No. 11/957,127.
Non-Final Office Action mailed Sep. 28, 2011 in U.S. Appl. No. 11/957,219.
Non-Final Office Action mailed Aug. 9, 2011 in U.S. Appl. No. 12/033,652.
Final Office Action mailed Sep. 14, 2011 in U.S. Appl. No. 12/033,627.
Non-Final Office Action mailed Jul. 21, 2011 in U.S. Appl. No. 11/957,139.
Non-Final Office Action mailed Aug. 23, 2011 in U.S. Appl. No. 11/957,206.
Non-Final Office Action mailed Oct. 6, 2011 in U.S. Appl. No. 11/957,151.

(56) References Cited

OTHER PUBLICATIONS

Notice of Allowance mailed Aug. 24, 2011 in U.S. Appl. No. 11/957,182.

Notice of Allowance mailed Oct. 27, 2011 in U.S. Appl. No. 11/957,210.

B.L.Smith, et al. Meeting Real-Time Traffic Flow Forecasting Requirements with Imprecise Computations. Computer-Aided Civil and Infrastructure Engineering. May 2003. pp. 201-213. vol. 18, No. 3. Blackwell Publishing.

Non-Final Office Action mailed Oct. 30, 2013 in U.S. Appl. No. 11/957,219, 5 pages.

Final Office Action mailed Nov. 22, 2013 in U.S. Appl. No. 12/033,690, 37 pages.

Final Office Action mailed Sep. 23. 2013 in U.S. Appl. No. 12/033,627, 12 pages.

Notice of Allowance mailed Dec. 19, 2013 in U.S. Appl. No. 12/466,308, 6 pages.

\* cited by examiner

ROUTE MONETIZATION

CROSS-REFERENCE

This application is a continuation-in-part of U.S. patent application Ser. No. 11/426,903 entitled "COLLABORATIVE ROUTE PLANNING FOR GENERATING PERSONALIZED AND CONTEXT-SENSITIVE ROUTING RECOMMENDATIONS" filed on Jun. 27, 2006, the entirety of which is herein incorporated by reference.

This application relates to U.S. patent application draft with Ser. No. 11/957,127 entitled "FEDERATED ROUTE PRODUCTION".

This application relates to U.S. patent application draft with Ser. No. 11/957,139 entitled "DESTINATION AUCTIONED THROUGH BUSINESS OF INTEREST".

This application relates to U.S. patent application draft with Ser. No. 11/957,151 entitled "GENERATIONAL INTELLIGENT NAVIGATION MANIPULATION".

This application relates to U.S. patent application draft with Ser. No. 11/957,167 entitled "SOCIAL NETWORK BASED ROUTES".

This application relates to U.S. patent application draft with Ser. No. 11/957,187 entitled "ROUTE TRANSFER BETWEEN DEVICES".

This application relates to U.S. patent application draft with Ser. No. 11/957,188 entitled "ADDITIONAL CONTENT BASED ON INTENDED TRAVEL DESTINATION".

This application relates to U.S. patent application draft with Ser. No. 11/957,206 entitled "AUTOMATIC SPLICES FOR TARGETED ADVERTISEMENTS".

This application relates to U.S. patent application draft with Ser. No. 11/957,210 entitled "PEDESTRIAN ROUTE PRODUCTION".

This application relates to U.S. patent application draft with Ser. No. 11/957,219 entitled "ROUTE GENERATION BASED UPON ACTIVITY CRITERIA".

TECHNICAL FIELD

The subject specification relates generally to traffic routing and in particular to providing a route with monetary optimization.

BACKGROUND

Advertisements are an important part of popular culture—phrases utilized in advertisement have become integrated in the vernacular and numerous organizations track reactions to advertisements. Various mediums can be employed to convey a company message, including newspapers, television, radio, billboards, etc. Large amounts of money are dedicated to advisement departments with a goal of achieving increased profits.

Companies can use a vast array of techniques to increase profits, ranging from targeted advertising to personal endorsements. In an illustrative example, if a company is attempting to market a product to teenagers, then it is unlikely commercials for the product will air on television/radio during school hours since relatively few students will be subjected to the advertisement. However, the company is relatively likely to purchase advertising during a commercial break of a popular after-school music program.

One manner used to increase profits is to amplify a number of patrons that enter the business. For instance, a department store can offer a coupon that a potential customer will receive about ten percent off a purchase of about fifty or more dollars. While the business is offering items at a lower price, there is a hope that the coupons will attract more individuals to enter the business. Moreover, the coupons provide an incentive to customers to spend over a requisite amount—commonly an amount that is greater than what an individual would have presumably spent even with the discount.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventional route generation systems construct direction sets to take into account various constraints for avoiding roads that permit relatively high speeds, evading areas under construction, etc. Two goals permeate classical route production systems: traveling between points in a fastest amount of time and/or traveling between points in a shortest amount of distance. The systems focus on lessening impact of travel and ignore improving and highlighting benefits of travel.

The disclosed innovation produces a direction set that associates a reward with a direction subset. A user can be rewarded for taking an alternate route such that the user is subjected to advertising, passes a location at a critical time, etc. An analysis component identifies reward capabilities associated with a possible route. Based upon the identifications, a production component can alter an original route and present both an original route and an altered route to a user. The user can generally select if she would like to take the original route or if she is to take the altered route and receive the reward.

In addition, the disclosed innovation allows for multiple equivalent (e.g., near equal) routes to be produced. A selection is made for a route to be presented to a user based upon monetization opportunities of the route. For instance, businesses can offer money for a user to take a route (e.g., to be paid to a user, to be paid to a host, etc.) and based upon money offered, a route is selected.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
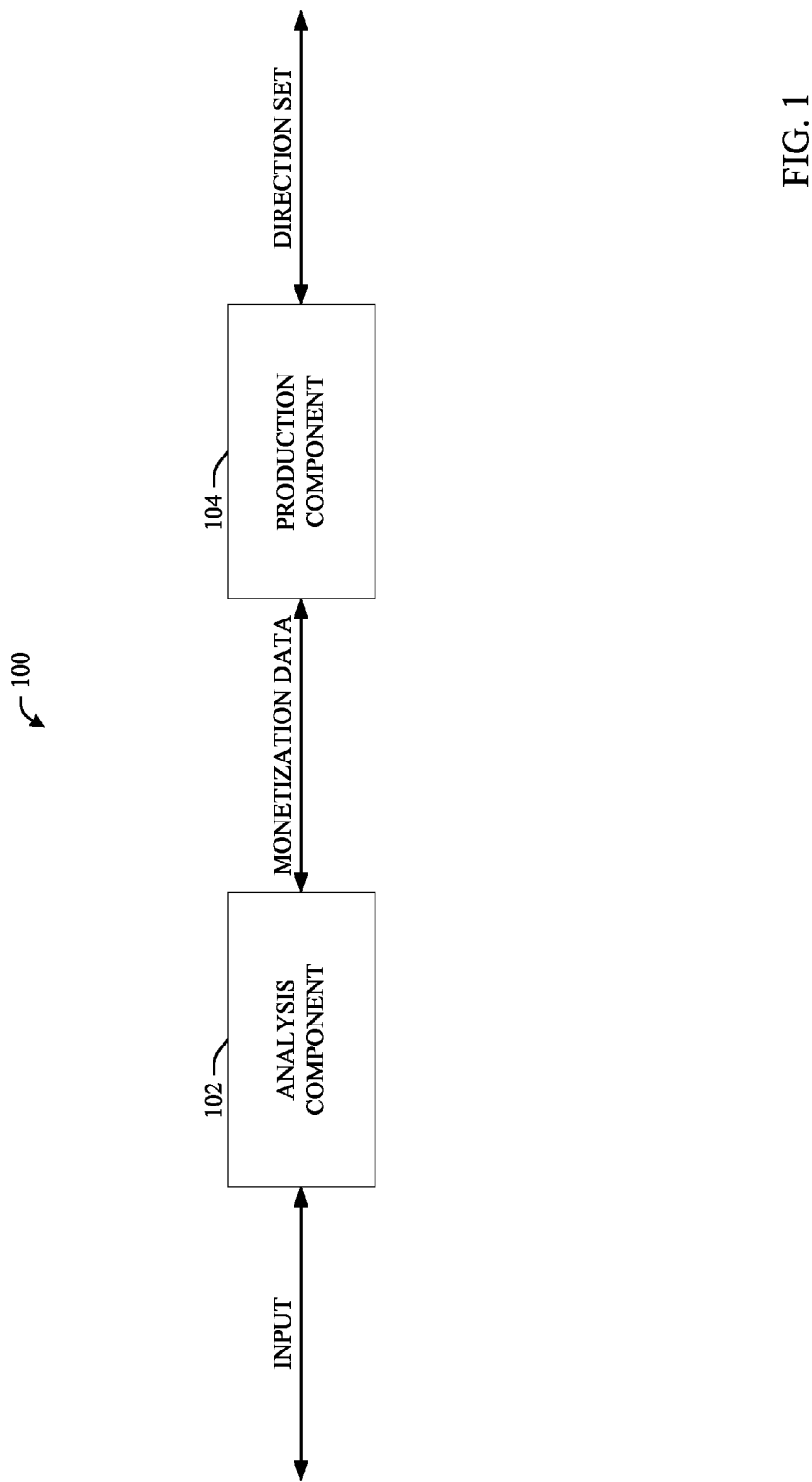
FIG. 1 illustrates a representative system for producing a route implementing a monetization opportunity in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for producing an improved financial route (e.g., optimized). Conventional route generation devices provide routes from a starting point to a destination with various constraints. In order to reach a destination, a user can have a route that he/she intends to follow through operation of a vehicle (e.g., automobile, motorcycle, bicycle, airplane, helicopter, motorboat, self-balancing transportation device, etc.). The generated route can be constructed to take the least amount of time, avoid highways, circumvent toll roads, employ back roads, etc. However, route production can also be used to provide routes that allow for an increase in reward opportunity (e.g., financial opportunity). For instance, a route can be produced that includes a five minute detour from a fastest route and for taking the detour a user (e.g., vehicle operator, vehicle passenger, etc.) will be paid about two dollars from a company. In taking the detour, the user is subjected to different targeted advertisements, thus making payment worthwhile to a company.

In an alternate embodiment, multiple equivalent routes can be produced (e.g., routes that have equal distance or estimated travel times, routes with distance or estimated travel time within a tolerance of one another, such as about five percent, etc.). Different entities can offer money to a host of the system 100 that a route be displayed that takes a user past a business of the entity. A route can be selected based upon offered money (e.g., a highest amount offered) and presented to a user, commonly without the user knowing that a route was selected to optimize money for the host. Money can be a partial consideration in selection; for instance a route can be selected based upon money offered to a host weighted against user interest in businesses located along a route.

As a user travels between different locations, there is an opportunity to convey information to the user. The user can travel down a street with a number of different automobile dealerships due to direction of a monetized direction set; the user can view a sign of a dealership that includes a trademark, new models available for sale, etc. This enables a company to gain various benefits, such as an increased likelihood the user will visit the dealership, increasing brand recognition, etc. and the company can be willing to pay for the benefits. In addition, a user can enjoy the experience if the user has an interest in automobiles. The disclosed innovation can be configured to produce a route that provides a user and/or a company with a high amount of reward.

Input is collected by an analysis component 102 that identifies a reward capability (e.g., opportunity to allow a financial transaction concerning a detour or lack thereof) of travel between at least two locations. The analysis component 102 can categorize various characteristics of route portions in a locality. Example characterization includes locating businesses, determining contextual information (e.g., it is dark outside and businesses could be difficult to see), traffic patterns, etc. The analysis component 102 performs calculations to determine a route and/or a route portion that could produce a relatively large financial transaction (e.g., monetization capability).

According to one embodiment, the analysis component 102 collects details concerning a locality without an original route. For instance, the analysis component 102 can obtain a starting point, an intended destination, and contextual information concerning a city that holds the starting point and intended destination. The analysis component 102 can construct at least about one direction set, commonly between at least two or more locations. There can be various constraints in construction, such as constraints discussed concerning conventional practice. However, the analysis component 102 can receive a route from an auxiliary location (e.g., inputted by a user, transferred from an outside generation component, etc.) as well as contextual information concerning the route and surrounding area.

Assessment of the route can be performed that establishes different opportunities for monetization. Internal logic can be used in distinguishing between various situations and estimating probability that monetization is possible in a particular situation. For instance, a route can be detoured to take a user past a business district—assessment of the district is made to determine entities that could/would pay money to have the detour, how much the entities would pay, etc. Based upon the assessment, the analysis component 102 can make an identification of a monetization capability (e.g., a check if businesses are willing to pay money, is money offered worthwhile, etc.)

Output of the analysis component 102 can transfer to a production component 104 that augments a direction set based on at least about one identification of the analysis component 102. The analysis component 102 can produce an initial route as well as a location that the user should pass to gain a reward (e.g., a fiscal incentive)—the route is changed by the production component 104 to include a pass of the location. Augmentation of a direction set can include modifying an existing route or creating a new route. The analysis component 102 or the production component 104 can implement upon a vehicle, a portable electronic device (e.g., a cellular telephone), a gaming system, a desktop computer, etc.

The following is an illustrative example of practice of the system 100. A user can desire to travel from her home to a downtown area, where the home and downtown area are in adjacent cities. There can be production of a route from the home to the downtown area intended to take a minimal amount of time. Assessment of the route can allow for a determination of possible locations that can produce a monetization opportunity. For instance, near the route there can be a shopping mall, gasoline station, and a restaurant. The analysis component 102 identifies different monetization opportunities concerning the route—such as contacting establishments near the route asking if the establishments will pay to have a route detoured. The shopping mall can offer that if the user takes an about two minute detour to pass by the shopping mall, then the shopping mall is willing to pay a company who operates the system about one dollar and/or to pay the user about one dollar. This information can be transferred to the production component 104 where two routes are outputted: the route originally generated and the route with the shopping mall detour.

While portions of the subject specification disclose modifying a direction set to produce a monetary benefit, it is to be appreciated that other implementations can be utilized. A user can be offered to take a detour past a high-end car dealership. As the user passes by the dealership, the user can be exposed to exclusive content (e.g., via a radio device) concerning available vehicles that is not available elsewhere. Moreover, route augmentation can take place 'on-the-fly' based on situational information. For instance, a user can be offered an about five percent discount on gasoline to pass by a gasoline station when his vehicle is near empty.

Figure 2:
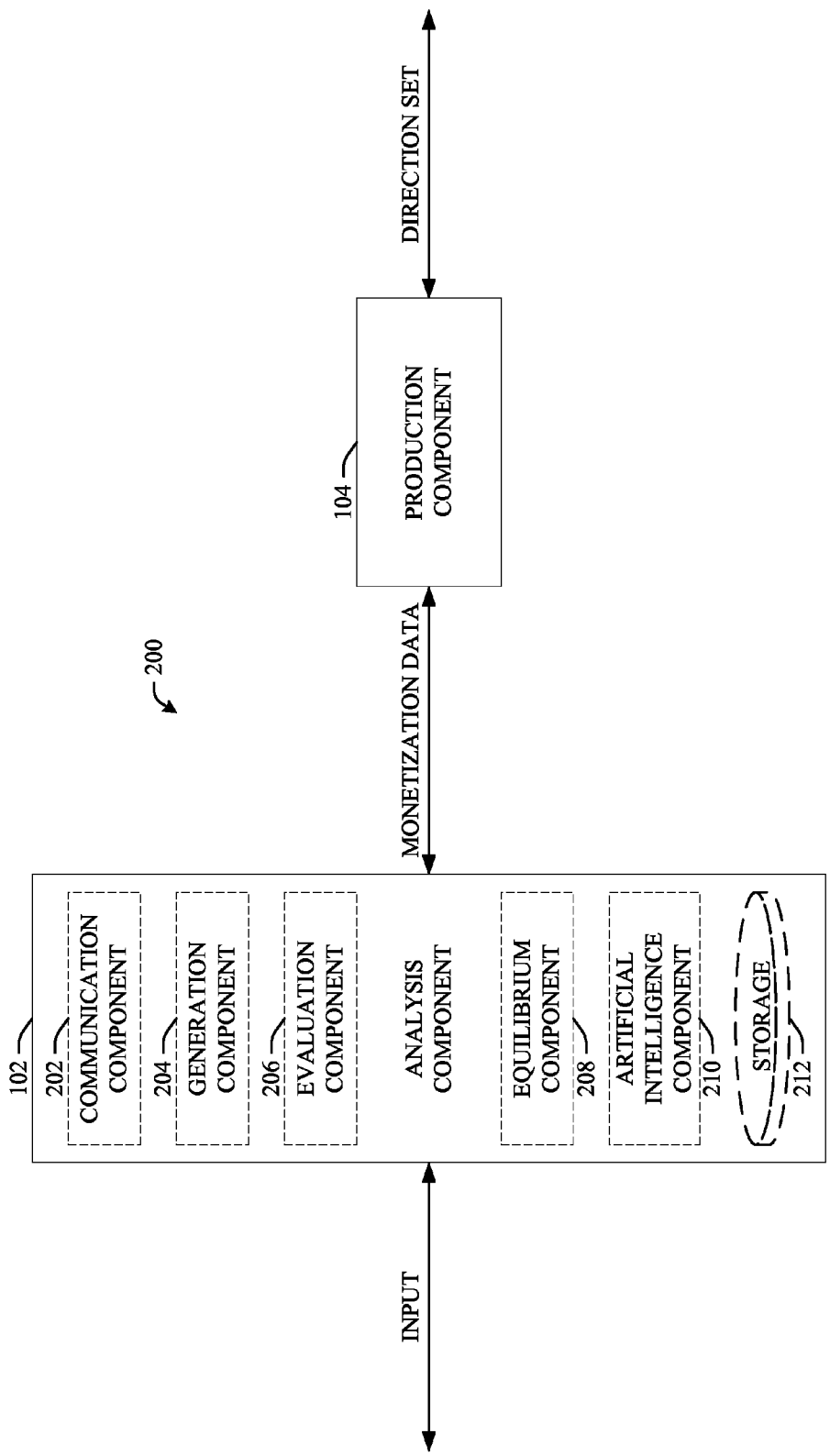
FIG. 2 illustrates a representative system for producing a route implementing a monetization opportunity with a detailed analysis component in accordance with an aspect of the subject specification.

Now referring to FIG. 2, an example system 200 discloses production of a monetized direction set—particularly aspects of an analysis component 102. A communication component 202 can engage with other devices to transfer information. Operation can take place wirelessly, in a hard-wired manner, employment of security technology (e.g., encryption), etc. Moreover, the communication component 202 can utilize various protective features, such as performing a virus scan on obtained data and blocking information that is positive for a virus.

The communication component 202 can obtain a starting point and intended destination—based upon the obtained data a route can be constructed by the generation component 204. According to one embodiment, the generation component 204 determines through a global positioning system that a location of a vehicle operating the system 200, as well as contextual information such as time of day. For example, at 8:30 am on weekdays, the user can often drive from her home to her office. The generation component 204 can make note of a driving pattern and infer (e.g., through artificial intelligence techniques) that a route will be from her home to her office at a requisite time. The generation component 204 can produce a route based upon a user request. For instance, a user can input that she would like a route estimated to take a shortest amount of distance and the generation component 204 builds a route based on the user request. An evaluation component 206 can assess the route produced by the generation component 204 and locate monetization capabilities of the route as well as possible modifications of the route (e.g., detours).

While the subject specification discusses monetization from a business standpoint (e.g., businesses paying money to have a vehicle travel past the business), it is to be appreciated that other configurations are possible. For instance, a local government can have an interest in keeping traffic balanced (e.g., not allowing some roads to have too high of congestion, populating shipping lanes utilized with less frequency, etc.). An equilibrium component 208 can scrutinize traffic patterns and produce reward opportunities to allow traffic to stay balanced—therefore, augmentation is based upon a congestion pattern.

For example, a relatively large number of vehicles can be exiting a downtown area after a baseball game. Commonly, highways are utilized by individuals to leave the area and popular use of the highways can create congestion. The equilibrium component 208 can scrutinize a traffic situation and a determination can be made (e.g., through artificial intelligence techniques) that there is an opportunity to provide a user a reward to avoid the highway for a period of time (e.g., about two hours after the baseball game). A government office can be contacted automatically to determine if a reward can be received if a user takes an alternative, non-highway route.

Artificial intelligence component 210 makes at least one inference or at least one determination toward reward capability identification or route augmentation. A user can have an interest in motorboats and a slight detour along a designated route can take the user past a motorboat dealership. An inference can be made that the user would accept less of a reward to pass the dealership due to his interest and/or infer that the user would like an augmentation performed automatically. In addition, the artificial intelligence component 210 can determine if a monetization opportunity and/or route augmentation is reasonable. For instance, taking a teenage driver past taverns with an age restriction the teenager does not meet can be considered unreasonable. In addition, having a route augmentation (e.g., adding a detour to a route) that takes a user on a detour multiple factors longer then an intended route can be unreasonable (e.g., take a user on an about five mile detour when the user is upon an about one mile route).

Artificial intelligence component 210 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Storage 212 can be arranged in a number of different configurations, including as random access memory, battery-backed memory, hard disk drives, magnetic tape, etc. Various features can be implemented upon storage, such as compression and automatic back up (e.g., use of a Redundant Array of Independent Drives configuration).

Utilization of storage 212 increases possible functionality of the system 200. In one example, the analysis component 102 can use learning techniques to identify a reward capability. A particular company can have previously turned down requests to reward a user for taking a detour on numerous occasions without acceptance. History concerning the particular company can be retained in storage 212. The artificial intelligence component 210 can infer that the particular company is not a viable opportunity and stop consideration of the company in an effort to conserve system resources (e.g., processing speed).

Figure 3:
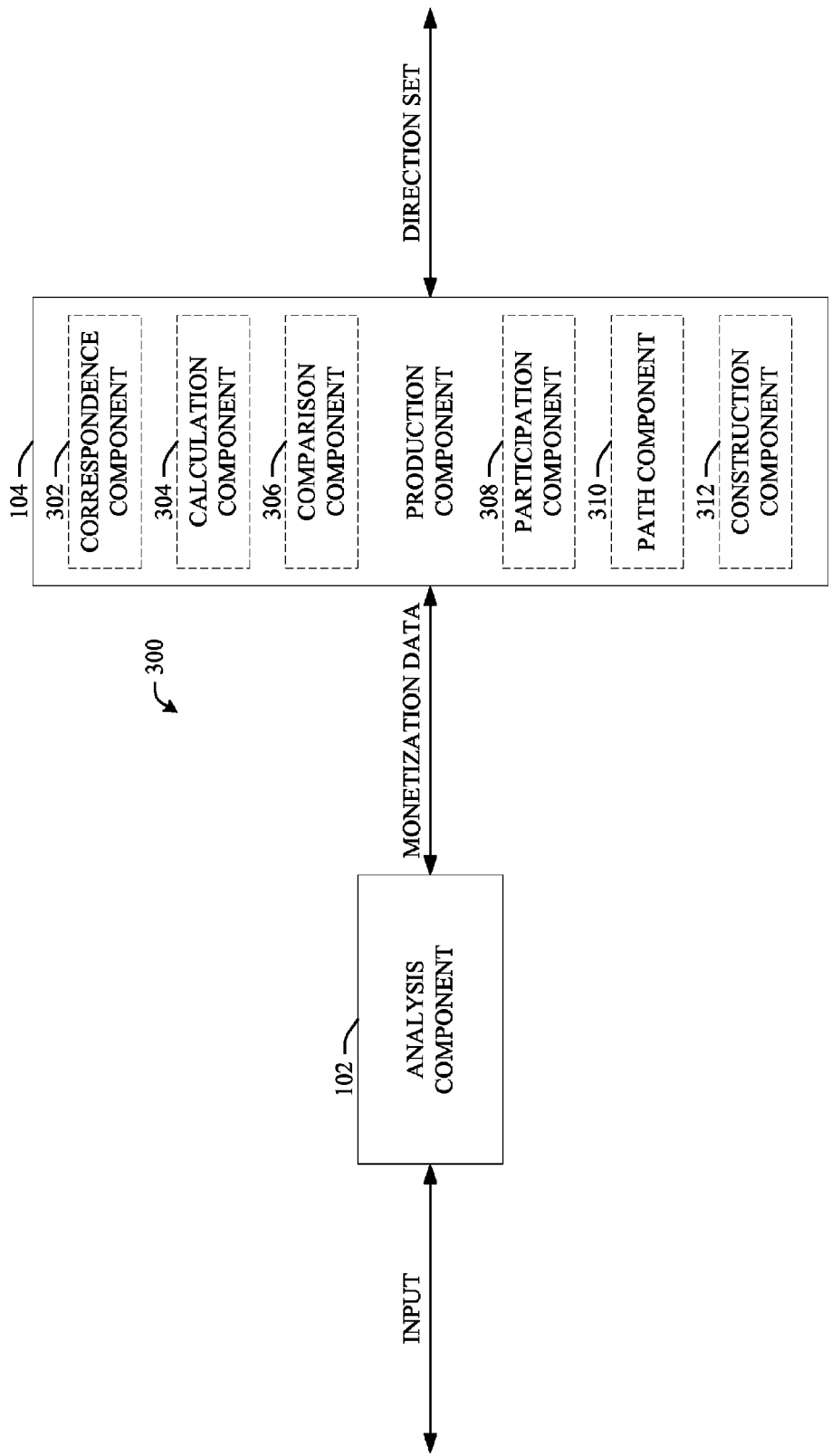
FIG. 3 illustrates a representative system for producing a route implementing a monetization opportunity with a detailed production component in accordance with an aspect of the subject specification.

Now referring to FIG. 3, an example system 300 discloses production of a monetized direction set—particularly aspects of a production component 104. An analysis component 102 collects input (e.g., contextual data) and identifies a reward capability of travel between at least two locations. Identified results, contextual data, an original route, and the like are transferred to the production component 104 so a direction set can be adequately augmented to increase travel monetization.

A correspondence component 302 can engage with other devices to transfer information, such as collecting output of the analysis component 102. Operation can take place wirelessly, in a hard-wired manner, employment of security technology (e.g., encryption), etc. Moreover, the correspondence component 302 can utilize various protective features, such as performing a virus scan on obtained data and blocking information that is positive for a virus.

Information obtained by the correspondence component 302 can be processed by a calculation component 304 that computes a monetary factor; the monetary factor is used by the production component 104 to augment the direction set. Multiple businesses can offer different amounts to have a user take an alternative route. In an illustrative example, a user can have an intended route to take 'Main Street' while about three businesses offer money for the user to detour on 'West $3^{rd}$ Street' and about two businesses request a detour on 'East $3^{rd}$ Street', where the detour is associated with a monetary reward. The calculation component 304 can perform computations to determine if travel upon 'East $3^{rd}$ Street' or 'West $3^{rd}$ Street' would produce a higher reward for the user. Logic can be utilized by the calculation component 304 to distinguish between unequal rewards. For instance, if businesses on 'West $3^{rd}$ Street' are offering coupons while businesses on 'East $3^{rd}$ Street' are offering financial credit (e.g., placing money in a bank account), the calculation component 304 can resolve which reward can be more beneficial (e.g., through analysis of previous user actions, such as if a user has responded highly to coupon offers). Aside from businesses, aspects of the subject specification can be applied to other areas, such as with municipalities—an implementation allows lowering traffic around hospital emergency entrance areas.

Computation results can be processed by a comparison component 306 that balances a reward capability against a non-reward factor, the balance result is used by the production component 104 to augment the direction set. Rewards are commonly not a single factor for consideration in taking a route. Other non-reward factors can be taken into account, such as timing (e.g., a user is in a hurry to reach a location), inconvenience (e.g., there are numerous confusing turns to a route that would be highly monetized), safety (e.g., a monetized route can include roads that have a higher history of traffic accidents), etc. The comparison component 306 can include a sifting capability to eliminate unrealistic opportunities. For instance, an opportunity that a user can obtain an about one dollar reward for traveling about 200 miles out of her initial route can be considered unrealistic and the comparison component 306 can eliminate the possibility. It can simply use the current gas price and the car gas mileage, but more complex factors can be added (owners time, etc.).

Using the example describing operation of the calculation component 304, 'East $3^{rd}$ Street' can have a higher reward potential (e.g., a user is offered about five dollars) then 'West $3^{rd}$ Street (e.g., a user is offered about three dollars). However, 'East $3^{rd}$ Street' can have relatively heavy construction that would make for difficult driving, which is undesirable to the user. The comparison component 306 can determine (e.g., through artificial intelligence techniques) if travel upon 'East $3^{rd}$ Street' or 'West $3^{rd}$ Street' is more desirable, taking into account reward factors computed by the calculation component 304 and non-reward factors.

A user can input information relevant to direction augmentation through a participation component 308. The participation component 308 can be implemented as a keyboard, microphone, touch screen, mouse, optical scanner, etc. to obtain user input, where the user input is used in direction set augmentation. According to one embodiment, the user can be presented an option to approve a monetized route. It is possible that there can be a relatively large number of routes and presentation of the routes can become cumbersome to the user. The participation component 308 can include filtering logic, such that limited route options are presented to a user (e.g., a route with a highest reward capability, a route with highest balance between reward and non-reward factors), etc. The user can select a route to use in the direction set through engagement of the participation component 308.

A path component 310 locates conduits of travel to enable a user to travel along a monetized route. Using the example previously disclosed, it could be determined that the user should take 'West $3^{rd}$ Street'; however, a user is traveling upon 'Main Street'. The path component 310 can identify that the user should travel south upon 'Market Street' to reach 'West 3$^{rd}$ Street' prior to the opportunities (e.g., the businesses) and then north upon 'Maple Avenue' to return to 'Main Street'. The path component 310 can include logic that enables optimization, such that a user performs rewarded travel in a least amount of time.

Results of the path component 310 can be used by a construction component 312 to build a direction set considering rewards, commonly based upon a core route produced by the generation component 204 of FIG. 2. The construction component 312 can build different routes that are equivalent to a base route. For instance, a user can request that a route be constructed that takes a shortest amount of time between two points and the generation component 204 of FIG. 2 creates a core route that is estimated to take a user about thirty minutes. The construction component 312 can build variations off the core route that takes a user past various businesses that takes no longer then thirty-five minutes (e.g., thirty minutes and thirty-five minutes are considered equivalent). Moreover, the construction component 312 can create routes tailored to an entity, such as a route that takes a user past entity businesses, but also avoids competitor businesses It is to be appreciated other configurations of the production component 104 are possible. For example, the path component 310 and construction component 312 can initially construct routes. The calculation component 304 and comparison component 306 can perform operations upon the constructed routes and based upon operation results, the production component 104 produces a direction set.

Figure 4:
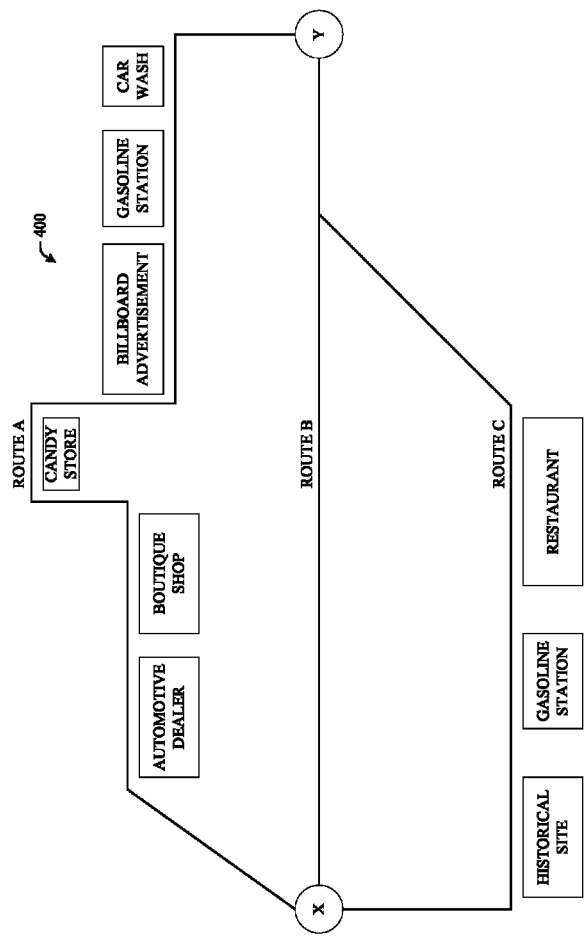
FIG. 4 illustrates a representative route alignment in accordance with an aspect of the subject specification.

FIG. 4 discloses an example route configuration 400 produced by the system 100 of FIG. 1. There are three routes disclosed, Route A, Route B, and Route C that travel between a starting point X and a destination point Y. A conventional route generation device could produce Route B, which is a shortest distance between points X and Y.

Practice of the system 100 of FIG. 1 allows multiple routes to be produced. In one example, a candy store can send a request to the analysis component 102 of FIG. 1 that a user should take a route that diverts her to the candy store and the user will be financially compensated for the diversion. The analysis component 102 of FIG. 1 can make a request to other businesses to determine if they would like to pay money to have the user pass by their stores. An automotive dealer, gasoline station, and car wash can evaluate metadata concerning the user (e.g., produced from a profile held in storage 212 of FIG. 2 produced through the communication component 202 of FIG. 2) to determine if an offer should be made. The gasoline station can determine the user could benefit from additional fuel, the car wash can discover that that the user's car is dirty and could use a wash, and the automotive dealer can evaluate her history and learn she is looking for a new automobile. These three businesses can offer a reward for the user to take routes by their businesses in addition to the candy store. Route A can be outputted by the production component 104 of FIG. 1 as an augmentation of Route B. The user can pass other locations, such as a boutique shop and billboard advertisement, without them paying financial compensation; thus, entities can gain a free benefit from transactions between other parties.

Route C can be used as an alternative direction set that balances convenience (e.g., less distance, fewer turns, less time, etc.) against monetization. A gasoline station and restaurant can offer a monetary reward to the user that is smaller then what is offered for the user taking Route A. However, the comparison component 306 of FIG. 3 can determine (e.g., through artificial intelligence techniques) that a user can have a greatest benefit from taking Route C. Route C can have an added bonus of having a recognizable landmark (e.g., a historical site to turn upon), being shorter then Route A, incorporating portions of Route B, etc.

Figure 5:
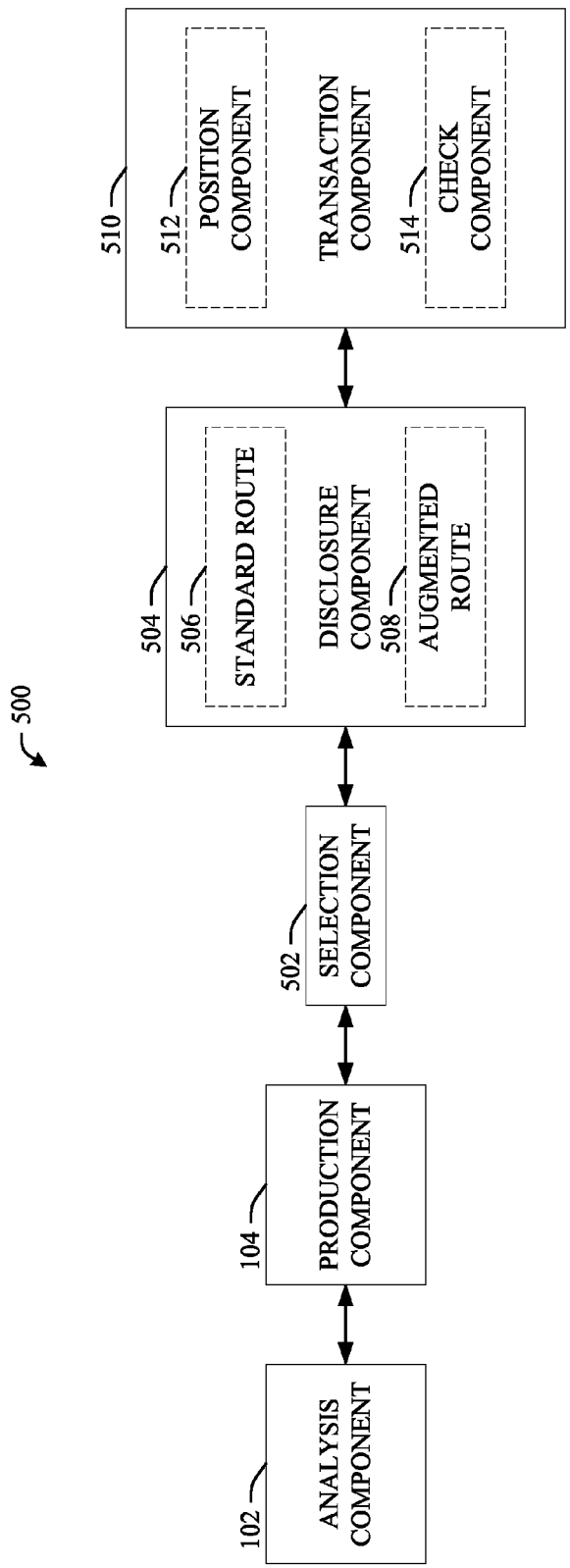
FIG. 5 illustrates a representative system for producing a route implementing a monetization opportunity and presenting the route in accordance with an aspect of the subject specification.

With reference now to FIG. 5, a system 500 is shown for disclosing a route to the user and performing financial operations in conjunction to the route. An analysis component 102 can perform evaluations upon potential opportunities for route rewarding (e.g., monetization). The analysis component 102 can operate as a means for evaluating at least about one opportunity to provide a monetary compensation to a user by having the user travel along at least about one course. A production component augments (e.g., creates, modifies, etc.) a direction set to increase monetization associated with the route. The production component 104 can function as a means for crafting (e.g., builds, alters, etc.) a route that implements at least about one evaluated opportunity by including at least about one course in the route to increase the monetary compensation to the user against inconvenience. Additionally, the production component 104 can operate as a means for producing at least two equivalent routes (e.g., a core route through implementation of the generation component 204 of FIG. 2 and an augmented route).

A selection component 502 can choose a route outputted (e.g., augmented) by the production component 104. According to one embodiment, the production component 104 augments at least two direction sets and the selection component chooses an augmented route based upon at least one identified reward capability. However, the selection component 502 can determine a route to choose based upon a core route (e.g., produced by the generation component 204 of FIG. 2) and an augmented route. The selection component 502 can function as a means for selecting a route for presentment to a user; selection is based at least in part upon reward opportunity of the route. Other possible selection criteria can include user preferences, extraneous factors (e.g., weather is bad and a user is an inexperienced vehicle operator), and the like. The selection component 502 can also weigh reward opportunities. For instance, a higher amount can be rewarded for Route A if a user makes a stop at a business while a lesser amount is associated with Route B, but money is paid if the user drives by the business. The selection component 502 can determine which route should be chosen, commonly based upon opportunity cost calculations and user action predictions (e.g., likelihood the user will stop at a business).

Moreover, the selection component 502 can implement as a means for operating an auction, entities associate a reward with a route and selection is based upon a route with a highest bidder. For instance, the production component 104 can output ten routes equivalent to a core route. Entities (e.g., businesses) can be contacted to offer money for their route to be presented to a user. The entities can assign a monetary amount to a route and a route with a highest summation amount can be selected. The reward opportunity is a user taking a route (e.g., traveling along a route), a user taking a stop at a location along the route (e.g., entering a store), a monetization opportunity (e.g., a host or user is paid money if an action takes place), or a combination thereof.

A disclosure component 504 presents at least about one direction set to a user. A disclosure component 504 allows a user to appreciate a route and act upon the route (e.g., select the route, follow the route, etc.). A non-exhaustive list of disclosure components include a display screen, touch screen, speaker system, virtual reality environment, Braille production system, printer, etc. In addition, the disclosure component 504 can present information in multiple formats, such as showing a video with audio capabilities. According to one embodiment, the disclosure component discloses a standard route 506 (e.g., an original route produced by the generation component 204 of FIG. 2) and an augmented route 508 (e.g., modified by the production component 104). The user can select a route through touching an appropriate portion of the disclosure component 504 and disclosure component 504 can present the selected route in greater detail (e.g., provide turn-by-turn instructions). However, the disclosure component 504 can implement to produce a route chosen by the selection component 502.

A transaction component 510 can perform a reward transfer in conjunction with a reward-based route. In one example, a city government can offer a large commercial plane about one dollar not to fly over city airspace. In addition, the reward transfer can take place in relation to user response to a commercial detail (e.g., presented with a route). For example, an advertisement can be played that a user should stop at a highway exit for a cup of coffee. If the user takes the exit, buys the cup of coffee, buys a different item, etc., then payments of varying amounts can be made to an advertisement hosting service.

A position component 512 can track a vehicle operating at least a portion of the system 500 and relay coordinates to a central location. A check component 514 can hold criteria to receive a reward of a direction set (e.g., not to fly over city airspace). The vehicle can refer to the check component 514 to assure reward criteria are met. Once criteria are met (e.g., a flight is complete without going over airspace, a business is passed, etc.) the transaction component 510 can debit money from an account and transfer it a user and/or a company operating at least part of the system 500, etc. The transaction component 510 can function as means for providing the monetary compensation for meeting at least about one criterion related to at least about one opportunity.

Figure 6:
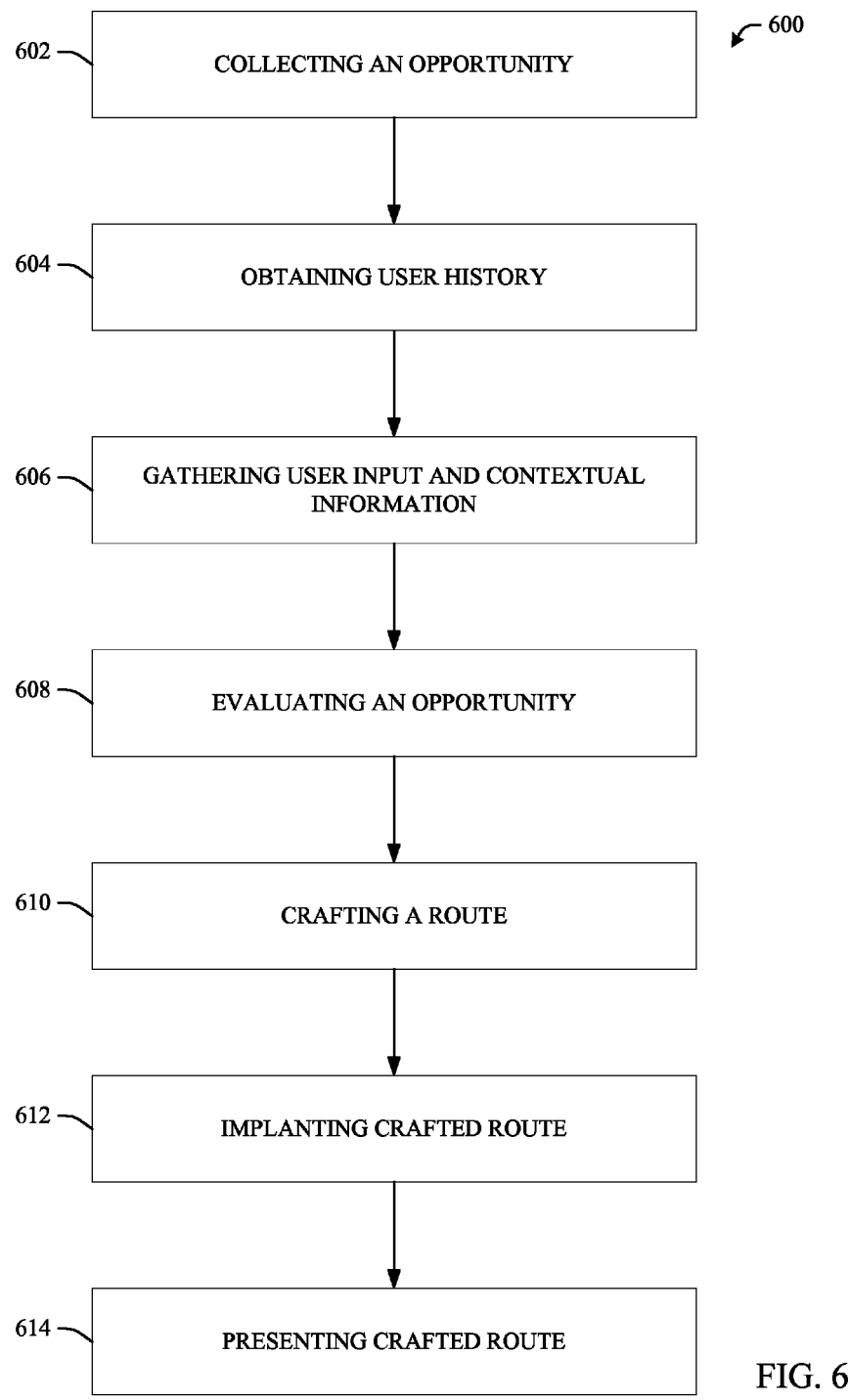
FIG. 6 illustrates a representative monetized route production methodology in accordance with an aspect of the subject specification.

FIG. 6 discloses an example methodology 600 for producing a rewarded route (e.g., a route offering an optimal monetization, offering a route balanced between reward and non-reward factors, etc.) Event 602 allows collecting at least about one opportunity (e.g., reward opportunity) that can be implemented upon a direction set. Collecting an opportunity can include searching for a potential source of a reward, making a request that a potential source transfer an offer, and/or obtaining the offer. In an illustrative example to be used throughout the description of the methodology 600, there can be a sporting goods store near an intended route. The sporting goods store can offer to reward a user and the main theme of the store focuses on wilderness activities.

At block 604, user history is obtained, commonly from internal vehicle storage. As a user operates a vehicle, a profile can be generated concerning the user and periodically updated. For instance, the user can be a teenager who plays high school football and has a history of frequenting sporting goods stores; a profile can be created with this information and ultimately extracted.

At event 606, an input from the user is gathered as well as contextual information. The teenager can place information in a display component that he plans to travel from his home to the local high school stadium. Information can be gathered such as weather conditions, time from kickoff, importance of the game, teenager role on the team, etc.

Act 608 evaluates the opportunity in light of data gathered at events 602, 604, and/or 606. It is highly likely the teenager will have an interest in the sporting goods store and contextual conditions, such as kickoff being several hours away, suggest the teenager will stop at the store as well as not need much incentive (e.g., reward) to visit the store. However, since the store specializes in areas outside of the teenager's interest, likelihood can be lowered. Act 608 can balance information results to determine if a route should be crafted, a reward that should be offered (e.g., the store provides a range that it will offer such as up to about one dollar and act 608 computes an accurate price), if a different route should be crafted, etc.

At block 610, a route is crafted that implements at least about one evaluated opportunity by including at least about one course in the route. For instance, it can be determined at act 608 (e.g., through artificial intelligence techniques) that the opportunity to take the teenager past the sporting goods store should be implemented in a route. A course can be added in the route to have the teenager pass the store.

Action 612 allows a crafted route to be implanted, such that it can be disclosed to the teenager. According to one embodiment, the crafted route is automatically provided to the user. However, the user can commonly be asked if he would like to use the reward-based route. A request can be made to the teenager if he would like to take the reward based route—the request commonly includes a potential reward, extra time the route will take, paths that are included, contextual data (e.g., traffic flow), etc. The teenager can react positively to the request so there is replacing an original route with the crafted route, appointing a crafted route (e.g., there is no original route if a user does not request a route, so the crafted route becomes the implanted route), etc.

At block 614, the crafted route is presented to the user. Various implementations can be used, such as showing the crafted route on a display screen, generating a printout on a home computer (e.g., performed with a user is outside of a vehicle), reciting 'turn-by-turn' instructions, etc. A presented route can be modified by the user, such as the teenager adds an ice cream store as a waypoint on the crafted route that is convenient to the sporting goods store.

Figure 7:
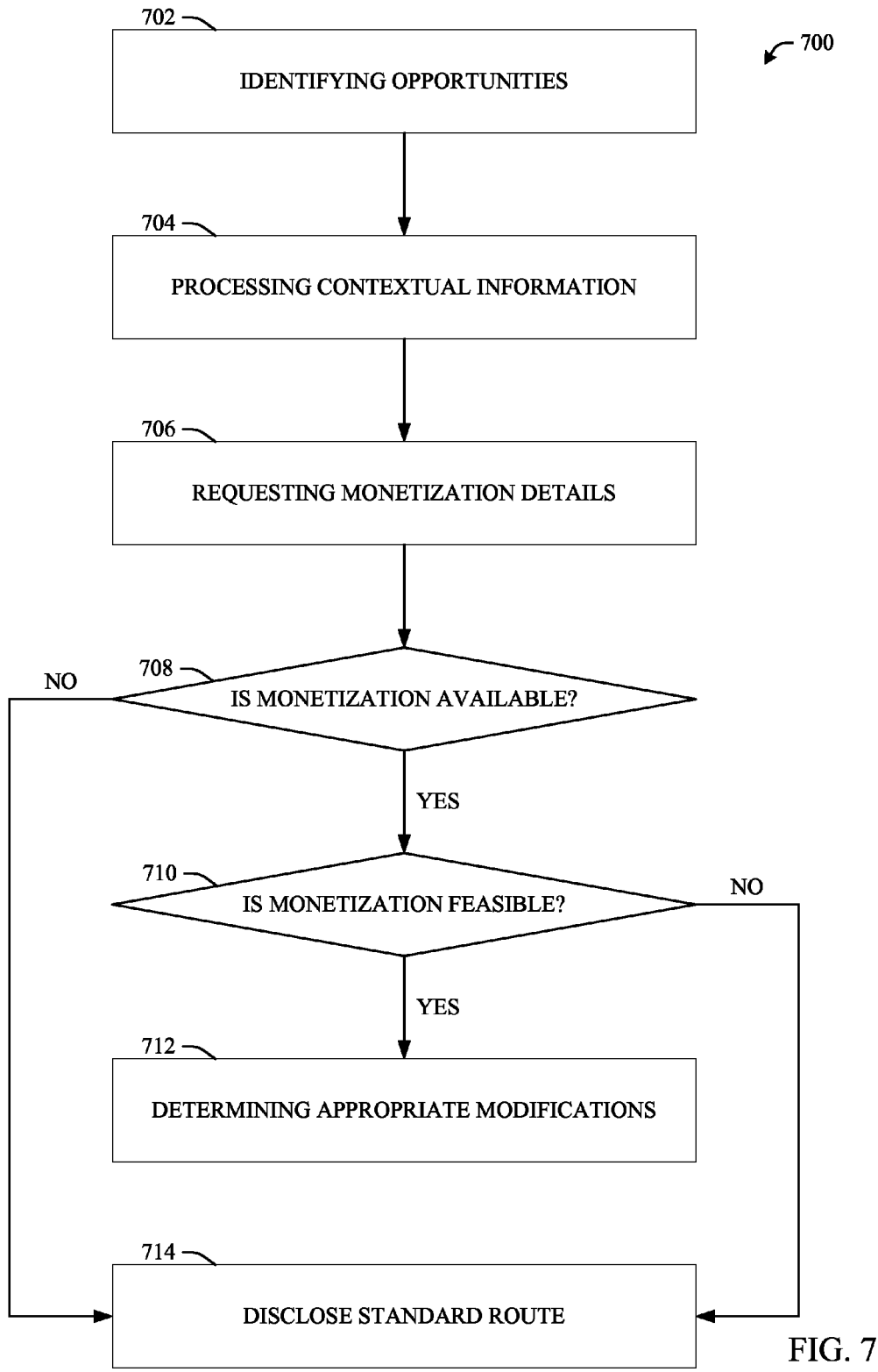
FIG. 7 illustrates a representative monetization opportunity evaluation methodology in accordance with an aspect of the subject specification.

FIG. 7 discloses an example methodology 700 for evaluating at least about one opportunity to provide a reward to a user by having the user travel along at least about one course (e.g., act 608 of FIG. 6). Opportunities available to be placed in a route (e.g., courses to be placed in a route) are identified at event 702. For instance, a high state/low state evaluation can take place—if a reward is offered by an entity, then entity is placed at a high state and the high state signifies an opportunity.

Contextual information opportunities are processed at event 704—for example, evaluating characteristics of a user and comparing standards against opportunity information. If there is an opportunity that is for a man to drive past a private gentleman's club, then a determination can be made if a driver is male or female.

At block 706, a request is made for monetization details, such as how much an entity is willing to offer, constraints of an offer, etc. A check 708 takes place to determine if monetization is available. Using the above example, if the driver is a woman and there is a constraint that for monetization the driver is to be a male, then the check can be slated as unavailable. A check 710 determines if a monetization is feasible. For instance, an opportunity can be for a user to pass by a fueling station when a user's vehicle is low on fuel. However, if the user's vehicle does not have enough fuel to reach the station, then the monetization capability is practically unfeasible.

If checks 708 and 710 respond in an affirmative answer, then appropriate modifications can be determined at action 712. For instance, determinations to alter a route in a manner to produce a highest amount reward. If either check 708 or check 710 respond in a negative, then a standard route can be disclosed at act 714 (e.g., a route without modification). It is to be appreciated that other outcomes are possible to a negative response, such as not disclosing a route (e.g., there is no original route).

Figure 8:
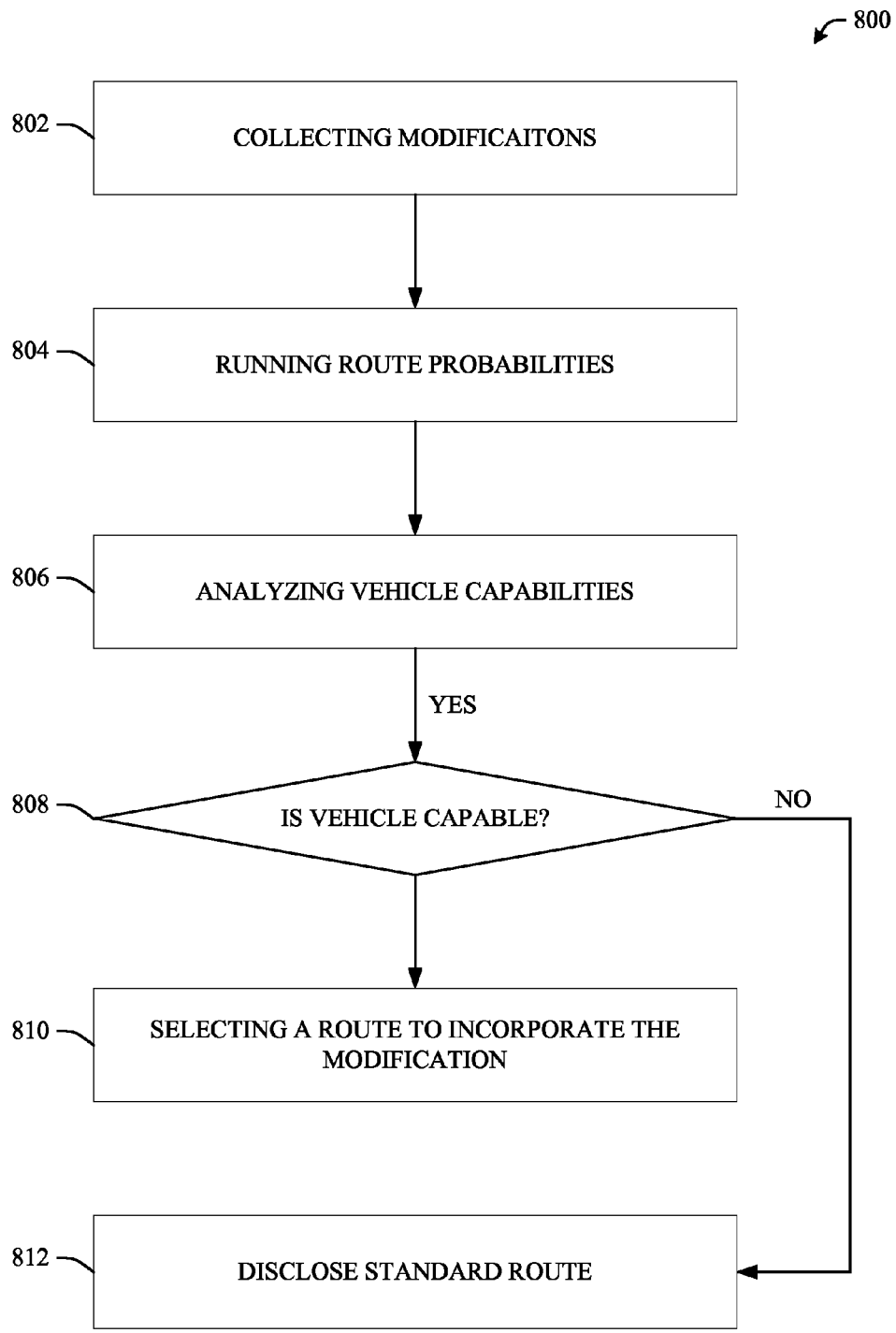
FIG. 8 illustrates a representative route crafting methodology in accordance with an aspect of the subject specification.

Now referring to FIG. 8, there is an example methodology 800 disclosed for crafting a route that implements at least about one evaluated opportunity by including at least about one course in the route (e.g., action 610 of FIG. 6). Modifications can be collected at event 802, commonly modifications that are produced by action 712 of FIG. 7.

At block 804, probabilities can be run to determine a likelihood of a user accepting a route with a modification. For instance, if a check performed upon a user schedule discovers the user is late for a meeting, then it is relatively unlikely the user will accept a route with a modification. If a probability is too low (e.g., below a standard threshold), then the methodology 800 can return to methodology 700 (e.g., action 712) to determine a different modification.

At block 806, vehicle capabilities are analyzed, such as evaluating vehicle clearance, miles until a scheduled oil change, fuel level, etc. Verification 808 determines if a vehicle is capable of taking a route with modifications. For instance, a modified route could require that a vehicle travel over rugged terrain—if a user's vehicle is a sports car, then it is highly unlikely the vehicle can handle the terrain. If the vehicle is capable, then event 810 occurs that allows for selection of a route (e.g., an original route) upon which a modification can be incorporated. In an alternative embodiment, the methodology 800 can continue to a route generation event. If the verification 808 determines a vehicle is not capable of following a route with a modification, then a standard route can be discloses 812, the methodology 800 terminates, etc.

While aspects of the subject specification relate to a user, such as a driver of a vehicle, considerations can be made for other individuals, such as vehicle passengers. For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media. Moreover, while a subset of the subject specification discloses operation of aspects though utilization of a vehicle, it is to be appreciated aspects can be practiced through alternative manners (e.g., walking, swimming, etc.)

Figure 9:
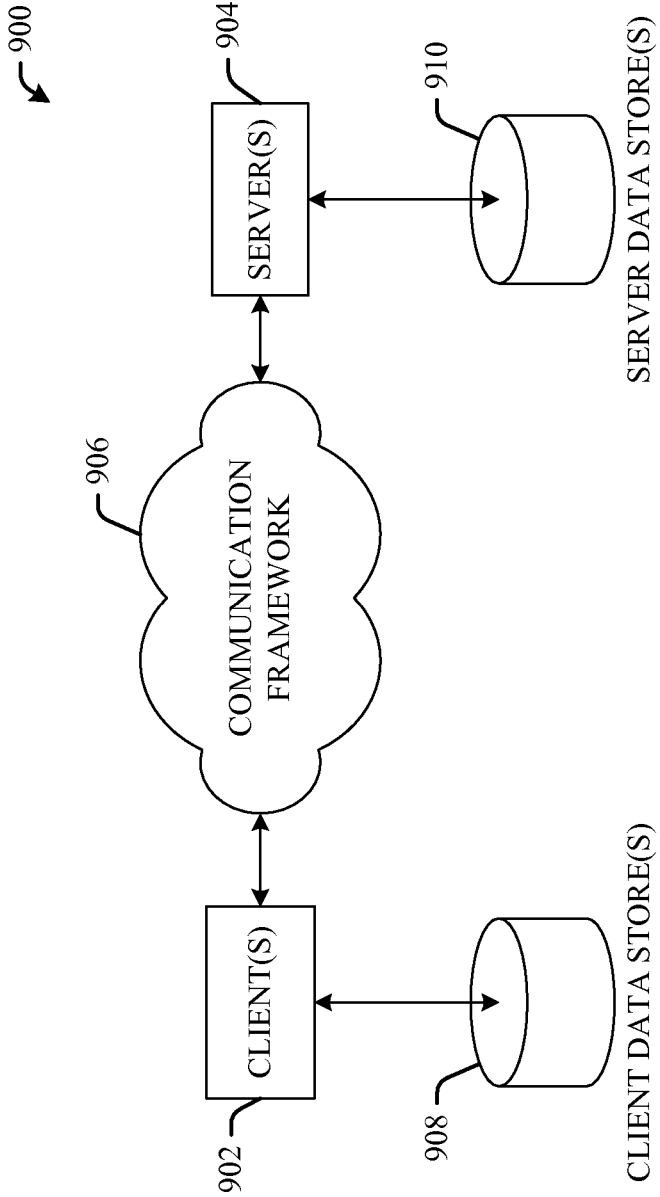
FIG. 9 illustrates an example of a schematic block diagram of a computing environment in accordance with the subject specification.
Figure 10:
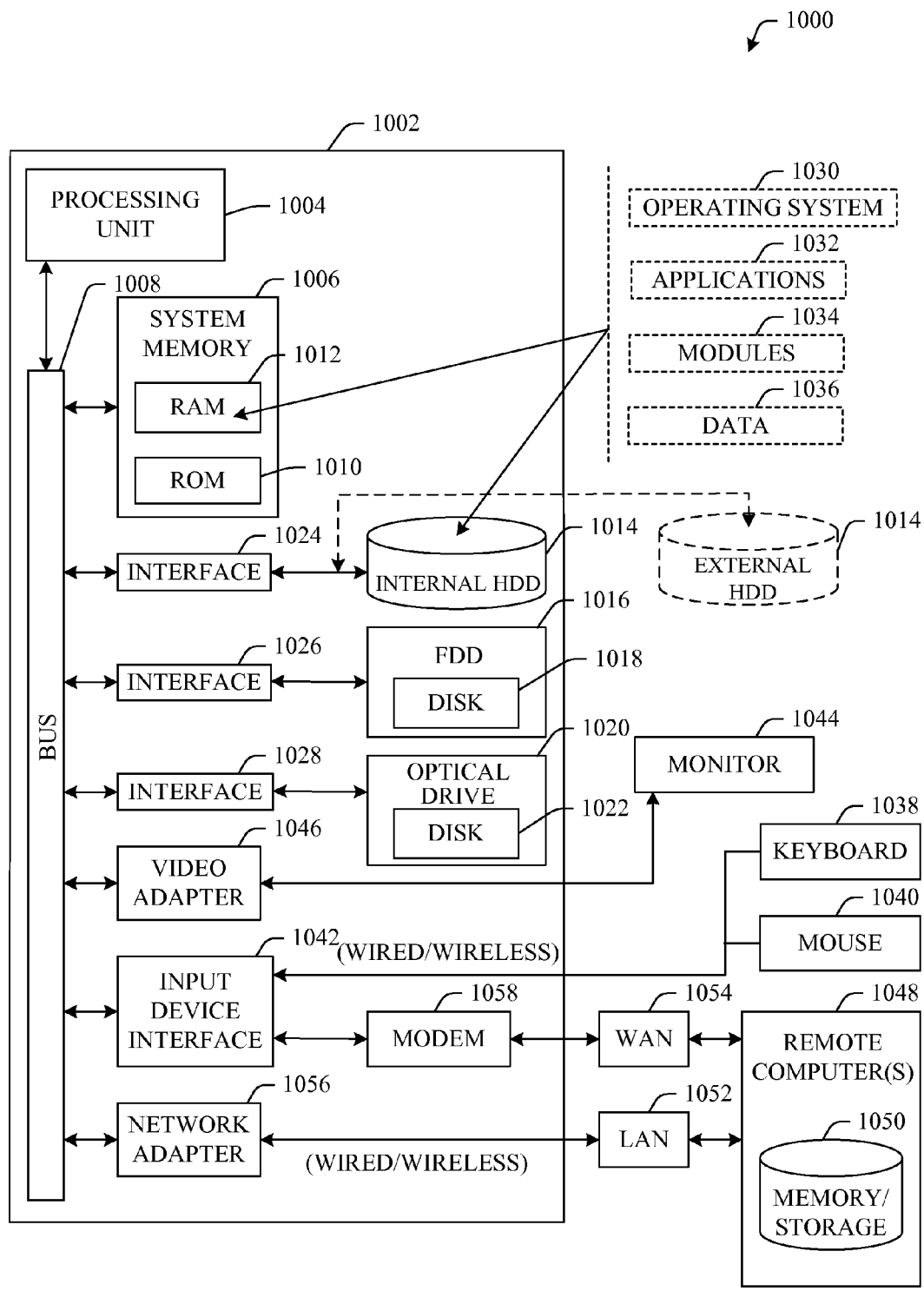
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction between several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising a processor coupled to a computer-storage medium, the computer-storage medium having stored thereon a plurality of computer software components executable by the processor, the computer software components comprising:
   an analysis component that identifies at least one reward capability of travel between at least two locations;
   a production component that augments a direction set based on at least about one identification of the analysis component; and
   an artificial intelligence component that makes an inference that a user would accept less of a reward to travel the augmented direction set due to an interest.

2. The system of claim 1, wherein the production component augments the direction set for monetary optimization.

3. The system of claim 1, further comprising a disclosure component that divulges the direction set to a user.

4. The system of claim 1, further comprising a selection component, wherein the production component augments at least two direction sets, and wherein the selection component chooses an augmented route based upon the at least one identified reward capability.

5. The system of claim 1, wherein the artificial intelligence component further makes at least one inference or at least one determination toward reward capability identification.

6. The system of claim 1, further comprising a comparison component that balances a reward capability against a non-reward factor, wherein the balance result is used by the production component to augment the direction set.

7. The system of claim 1, further comprising a calculation component that computes a monetary factor, wherein the monetary factor is used by the production component to augment the direction set.

8. The system of claim 1, further comprising a participation component that collects user input concerning the direction set, wherein the production component augments the direction set according to the user input.

9. The system of claim 1, further comprising an evaluation component that appraises route information, wherein identification of monetization capability is a function of route information appraisal.

10. The system of claim 1, wherein the at least one reward capability is a monetization capability, the direction set augmentation subjects a user to an advertisement, the direction set augmentation subjects the user to an establishment the user is relatively likely to visit, the direction set augmentation is based upon a congestion pattern, the analysis component is implemented upon a vehicle, the production component is implemented upon a vehicle, or a combination thereof.

11. A system comprising a processor coupled to a computer-storage medium, the computer-storage medium having stored thereon a plurality of computer software components executable by the processor, the computer software components comprising:
    a production component for producing at least two equivalent routes;
    a selection component for selecting a route for presentment to a user, wherein selection is based at least in part upon reward opportunity of the route; and
    an artificial intelligence component for inferring that a particular company is not a viable opportunity and, upon making such inference, ceasing consideration of the company to conserve system resources.

12. The system of claim 11, wherein the selection component further operates an auction, wherein entities associate a reward with a route, and wherein selection is based upon a particular route having highest bidder.

13. The system of claim 11, wherein the reward opportunity is a user taking a route, a user taking a stop at a location along the route, a monetization opportunity, or a combination thereof.

14. A computer storage media device storing computer-useable instructions that, when used by one or more computing devices, cause the one or more computing devices to perform a method, the method comprising:
- identifying at least one reward capability of travel between at least two locations;
- augmenting a direction set based on at least about one identification of the analysis component; and
- making an inference that a user would accept less of a reward to travel the augmented direction set due to an interest.

* * * * *